Feb. 17, 1931.    J. B. FLOWERS    1,793,075
WATERPROOFING AND GASPROOFING OF FABRICS
Filed Nov. 20, 1923

INVENTOR:
John B. Flowers.

Patented Feb. 17, 1931

1,793,075

UNITED STATES PATENT OFFICE

JOHN B. FLOWERS, OF BROOKLAWN, NEW JERSEY

WATERPROOFING AND GASPROOFING OF FABRICS

Application filed November 20, 1923. Serial No. 675,854.

The object of this invention is to make fabric as waterproof and gasproof as possible. Goldbeater's skin is now cemented to fine cotton cloth and on account of its extremely close texture it forms the most waterproof and gasproof material used for gascells for airships known to the present time. This material has many drawbacks. It is expensive, conditions for its application must be very closely regulated as to temperature, heat, etc., it deteriorates very rapidly in use, and it often serves as food for rodents. I have found by test that fabric may be waterproofed and gasproofed by cementing to it three layers of aluminum leaf with a resulting fabric superior in every way to goldbeater's skin fabric. It is easier to apply, has less weight, is more highly waterproofed and gasproofed, it is more durable and cheaper than goldbeater's skin fabric.

It is understood that this fabric may be used for a variety of purposes, for example, waterproof hats, and clothing of all kinds. When made into hats, it presents a very beautiful appearance, looking like polished silver. On account of its extreme thinness, 0.00002 inch, per layer, and resulting flexibility, metal leaf when cemented in place between two layers of cloth, and made into a coat has superior waterproof qualities to the regulation mackintosh.

Figure 1:
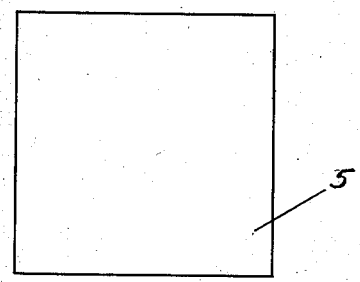
Figure 2:
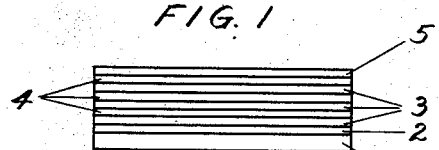
Figure 3:
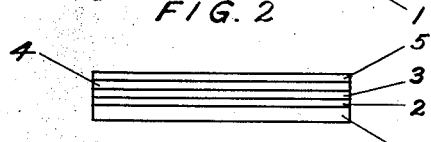
Figure 4:
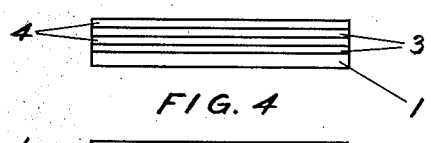
Figure 5:
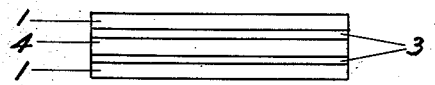
Figure 6:
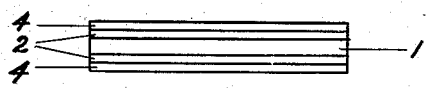
Figure 7:
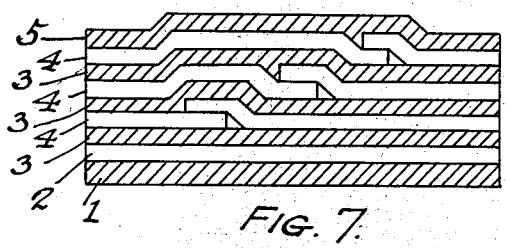

Fig. 1 is a plan view, Figs. 2 to 6 elevations of aluminum leaf or other metal leaf coated fabric, and Figure 7 a cross-sectional view through a small block of fabric made according to my invention.

In Figs. 1 to 7, 1 is the fabric, 2 is a layer of spread rubber, 3 are thin layers of rubber cement, 4 are layers of metal leaf and 5 is a coat of varnish. Figure 7 illustrates how when applying metal leaf the edges of the sheets of metal leaf 4 are lapped one over the other to secure the fish-scale effect of gastightness at the joints between sheets. Otherwise, in Figure 7, numbers 1 to 5 inclusive refer to the same or equivalent materials as in Figures 1 to 6 inclusive.

The process of manufacture is as follows. A roll of single-ply rubberized fabric is stretched out on a table covered with heavy linoleum and then clamped along the edges and coated with one coat of thin rubber cement using a soft 2 inch wide flat brush. The aluminum leaf is next applied lapping each sheet about ½ inch at the edges and one method of making such laps is shown in Figure 7. As the aluminum leaf has some small holes in it, two additional layers of aluminum leaf are added, the layers being cemented together with rubber cement, the holes in any one layer being covered by the whole part of the next layer. One day is allowed for each layer to dry out thoroughly and three days for the varnish coat.

After the rubber cement has reached the right tack, the leaf should be applied very rapidly over the surface. After the surface has been entirely covered, it should be left over night to dry when the rough edges of the laps should be rubbed away with a clean piece of cotton waste. In applying the leaf turn back the first page of the book half way and hold it between the first and second fingers of the right hand. The book itself should be held between the thumb and fingers, and in such a way that the back of the hand will be toward the work when the leaf is applied, the book being given a slight bend to prevent the corners of the leaf f· m dropping. The end of the leaf, exposed by turning back the first pages of the book, should be placed against the surface to be coated, and held securely in place with the left hand. The sheet held between the first and second fingers should be drawn back so as to allow the whole leaf to come in contact with the surface. The next layer should be applied in a like manner lapping edges with the first and so on. The best results will be obtained if the gilder works in the same direction with each row of leaf; that is, from left to right. If this is done, it will aid considerably in completing and smoothing off the surface. It is suggested that in turning the pages of the book, the back be held between the first two fingers of the left hand. The leaves from which the leaf has been removed should be turned back and held between the thumb and first finger of the left hand. The next sheet of paper may then be turned back, exposing one-half of the next sheet of leaf.

After three layers of aluminum leaf have been applied, the surface is coated with varnish using a soft brush.

The elongation in 2 inches of soft annealed aluminum such as aluminum leaf is 30 percent. The maximum elongation of fabric in 2 inches is 15 percent. There is therefore no chance of the aluminum leaf tearing before the fabric tears.

The flexibility is excellent. It does not wrinkle after creasing.

Tests made at the naval aircraft factory, Philadelphia, Pa., show two liters per sq. yd. in 24 hours with helium gas under a pressure of one inch of water. This compares very favorably with goldbeater's skin fabric in which a leakage of 3 liters is allowed.

The rubber cement for sizing the cloth and for cementing the aluminum leaf to it is made of pure rubber, benzol and benzine.

For gas-cell fabric BB cotton cloth is used.

While I have described the preferred method of producing my improved balloon cloth and have specified varnish as the protective coating, it will be understood that various changes may be made in material and method and that any elastic protective coating may be used without departing from the spirit of the invention, and hence I consider that I am at liberty to make such changes as fairly come within the scope of the appended claims.

Having thus described my invention, what I claim as new and desire to secure by Letters Patent is:—

1. A gasproof fabric composed of a layer of rubberized fabric, a layer of rubber cement, and a layer of metal leaf.

2. A gasproof fabric composed of a layer of rubberized fabric, a layer of rubber cement, and a layer of aluminum leaf.

3. A gasproof fabric composed of a layer of textile rubberized fabric, a layer of rubber cement, a layer of metal leaf, and a protective coating over the metal leaf.

4. The combination of one layer of fabric, a layer of spread rubber, alternate layers of rubber cement and aluminum leaf, the top layer of leaf being protected by varnish, for waterproofing, gasproofing purposes.

5. A gasproof fabric composed of a layer of textile fabric, a layer of spread rubber, and alternate layers of aluminum leaf and rubber cement, the edges of the sheets of aluminum leaf being lapped over one another.

6. The method of making a gasproof fabric consisting of applying alternate layers of rubber cement and metal leaf to a fabric; each layer of cement being allowed to dry until tacky before applying the metal leaf and to harden before applying the next layer of cement; the metal leaf being applied in sheets and the edges of the sheets being overlapped, substantially as described.

JOHN B. FLOWERS.